Jan. 3, 1928.

C. F. KURTZ

VENDING MACHINE CASE

Des. Re. 16,843

Original Filed July 25, 1927

Charles F. Kurtz, INVENTOR.

BY Walter N. Haskell, his ATTORNEY.

BEST AVAILABLE COPY

Reissued Jan. 3, 1928.

Des. Re. 16,843

UNITED STATES PATENT OFFICE.

CHARLES F. KURTZ, OF ROCK ISLAND, ILLINOIS, ASSIGNOR OF ONE-HALF TO HARRY E. LONG, OF ROCK ISLAND, ILLINOIS.

DESIGN FOR A VENDING-MACHINE CASE.

Original No. 73,528, dated September 27, 1927, Serial No. 22,867, filed July 25, 1927, for 3½ years. Application for reissue filed November 19, 1927. Serial No. 24,211. Term of patent 14 years.

*To all whom it may concern:*

Be it known that I, CHARLES F. KURTZ, a citizen of the United States, residing at Rock Island, in the county of Rock Island and State of Illinois, have invented a new, original, and ornamental Design for a Vending-Machine Case, of which the following is a specification, reference being had to the drawings, forming a part thereof, in which—

Figure 1:
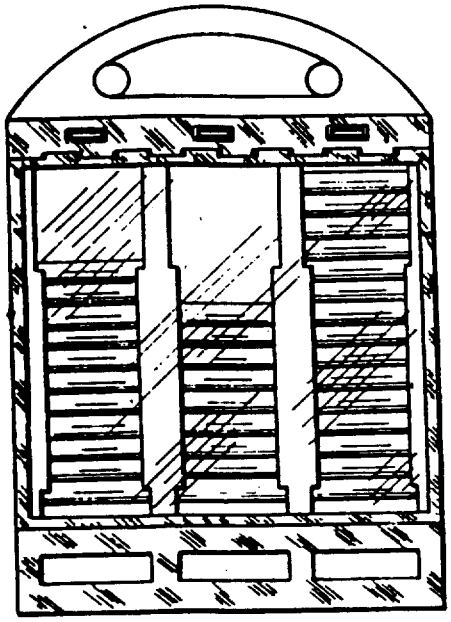
Fig. 1 is a front elevation of a vending machine case, showing my new design.
Figure 2:
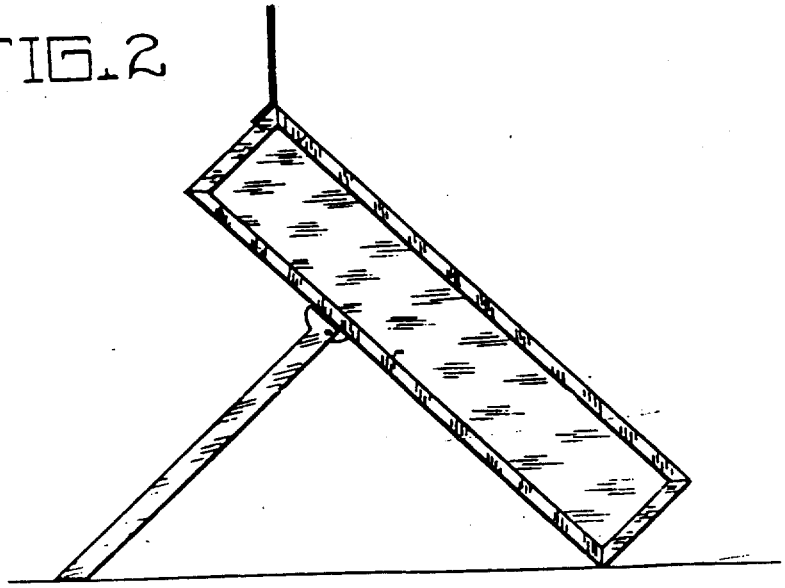
Fig. 2 is a side elevation thereof.

What I claim is:

The ornamental design for a vending machine case, as shown.

In testimony whereof I affix my signature.

CHARLES F. KURTZ.